United States Patent [19]

Parton et al.

[11] Patent Number: 4,933,269

[45] Date of Patent: Jun. 12, 1990

[54] PHOTOGRAPHIC SILVER HALIDE ELEMENT CONTAINING INFRARED FILTER DYES

[75] Inventors: Richard L. Parton, Rochester; David A. Stegman, Churchville; Ralph W. Jones, Jr., Hilton, all of N.Y.

[73] Assignee: Eastman Kodak Company, Rochester, N.Y.

[21] Appl. No.: 441,746

[22] Filed: Nov. 27, 1989

Related U.S. Application Data

[63] Continuation-in-part of Ser. No. 216,672, Jul. 7, 1988, abandoned.

[51] Int. Cl.$^5$ .............................................. G03C 1/84
[52] U.S. Cl. .................................... 430/522; 430/944; 544/361; 544/362; 546/198; 548/121; 548/156; 548/159
[58] Field of Search ................ 430/522, 944, 578; 544/361, 362; 546/198; 548/121, 156, 159

[56] References Cited

U.S. PATENT DOCUMENTS

| | | | |
|---|---|---|---|
| 2,955,939 | 10/1960 | Brooker et al. | 48/121 |
| 3,482,978 | 12/1969 | Fumia et al. | 548/121 |
| 3,623,881 | 11/1971 | Fumia, Jr. et al. | 96/127 |
| 3,671,648 | 6/1972 | Fumia, Jr. et al. | 260/240 |
| 3,672,906 | 6/1972 | Brooker et al. | 548/156 |
| 3,758,461 | 9/1973 | Fumia, Jr. et al. | 260/240.1 |
| 4,536,473 | 8/1985 | Mihara et al. | 430/944 |
| 4,581,325 | 4/1986 | Kitchin et al. | 430/522 |

*Primary Examiner*—Jack P. Brammer
*Attorney, Agent, or Firm*—Paul L. Marshall

[57] ABSTRACT

A infrared absorbing filter dye that also imparts a cool image tone after processing is disclosed for use in photographic elements. The dye has the formula:

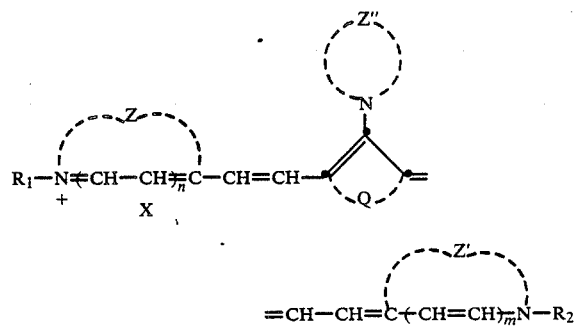

where

Z and Z' each independently represents the atoms necessary to complete a substituted or unsubstituted: thiazole nucleus, selenazole nucleus, indole nucleus, imidazole nucleus, or quinoline nucleus, $R_1$ and $R_2$ each independently substituted or unsubstituted alkyl or substituted or unsubstituted aryl, Z" represents the atoms necessary to complete a substituted or unsubstituted heterocyclic ring, Q represents the atoms necessary to complete a substituted or unsubstituted carbocyclic ring, m and n each independently represents 0 or 1, and X represents a counterion as needed to balance the charge of the molecule.

14 Claims, No Drawings

PHOTOGRAPHIC SILVER HALIDE ELEMENT CONTAINING INFRARED FILTER DYES

This application is a continuation-in-part of U.S. application Ser. No. 216,672, filed July 7, 1988, now abandoned.

FIELD OF THE INVENTION

This invention relates in general to photography and specifically to photographic filter dyes that absorb infrared light and are useful in infrared-sensitive photographic elements.

BACKGROUND OF THE INVENTION

Photographic elements often contain filter dyes for a variety of purposes. Filter dyes may be used as absorber dyes in photographic emulsion layers to improve image sharpness or adjust photographic speed. They may be used as antihalation dyes, for example, in a lower layer of an element to reduce halation in the image-forming layers. Filter dyes can also be used as general purpose filter dyes for absorbing light of a particular wavelength so that it does not expose or exposes at a reduced intensity a lower layer in the element.

Filter dyes may be present in essentially any layer of a photographic element where it is desired to absorb radiation in the region of the spectrum where the dye absorbs. For example, they may be contained in an interlayer, a radiation-sensitive layer, an overcoat layer, an undercoat layer, a backing layer, or others known in the art. Absorber dyes (also called integrain absorber dyes) are generally present in the radiation-sensitive layers of photographic elements. Antihalation dyes may be located in undercoat layers on either side of a transparent support carrying radiation-sensitive layers. Such antihalation layers may also be positioned between two or more radiation-sensitive layers in a multilayer element or as a backing layer on the side of the support away from the light-sensitive layer.

Photographic elements are often used in conjunction with information-recording equipment that exposes the element with infrared radiation emitted from a semiconductor laser diode. For example, in the medical diagnostics field, digital information from equipment such as computer assisted tomography equipment is often presented for viewing on a laser-exposed photographic element. Such diodes generally emit electromagnetic radiation having a wavelength of from about 730 nm to about 900 nm. A common laser wavelength is about 800 nm. Other laser emission wavelengths are about 750 nm, 780 nm, 820 nm, and 870 nm. Photographic elements used in conjunction with such information-recording equipment often require filter dyes that absorb in this region, for example, as antihalation or absorber dyes.

In addition to absorbing light in the region of interest, a filter dye should leave little or no undesirable stain after the photographic element is processed, so as not to affect the image tone of the exposed and processed element. In many situations, for example in the medical diagnostics field, a cool (i.e., blue-hued) image tone is desired. Viewers often find such cool tones pleasing to the eye and conducive to the reading of stored image information. A cool tone is often imparted to photographic elements by incorporating a blue dye in the support or in a layer of the element; however, this dye usually does not perform any other useful function in the element and the cool tone imparted by this dye can be adversely effected by other retained staining dyes.

Many infrared filter dyes leave significant stain in photographic elements after processing. For example U.S. Pat. No. 4,362,800 discloses 1,1,1',1'-tetramethyl-3,3'-bis(sulfoalkyl)-1H-benz[e]indolotricarbocyanine sodium salt. This dye has been used with some success as an infrared photographic filter dye, but it tends to leave an objectionable greenish stain after processing.

SUMMARY OF THE INVENTION

According to the present invention, there are provided photographic elements which utilize infrared filter dyes according to formula (I):

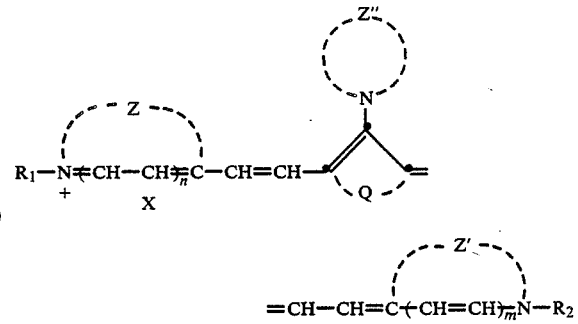

where

Z and Z' each independently represents the atoms necessary to complete a substituted or unsubstituted: thiazole nucleus, selenazole nucleus, indole nucleus, imidazole nucleus, or quinoline nucleus, $R_1$ and $R_2$ each independently substituted or unsubstituted alkyl or substituted or unsubstituted aryl, Z" represents the atoms necessary to complete a substituted or unsubstituted heterocyclic ring, Q represents the atoms necessary to complete a substituted or unsubstituted carbocyclic ring, m and n each independently represents 0 or 1, and X represents a counterion as needed to balance the charge of the molecule.

The filter dyes of formula (I) effectively absorb infrared radiation and also impart a desirable cool image tone to the exposed and processed element.

DESCRIPTION OF THE PREFERRED EMBODIMENTS

According to formula (I), Z and Z' each independently represent the atoms necessary to complete a substituted or unsubstituted: thiazole nucleus, selenazole nucleus, indole nucleus, imidazole nucleus, or quinoline nucleus. Of these, substituted or unsubstituted: thiazole nuclei, selenazole nuclei, or indole nuclei are preferred. These heterocyclic nuclei may be substituted by any of a number of groups known to be substituents for such nuclei. These include sulfo, halogen (e.g., chloro, fluoro), alkyl (preferably of about 1 to 4 carbon atoms, e.g., methyl, ethyl, propyl, butyl) which may themselves be substituted with known substituents such as sulfo or halogen, alkoxy (preferably of about 1 to 4 carbon atoms, e.g., methoxy, ethoxy, propoxy, butoxy) which may be substituted, substituted or unsubstituted aryl (e.g., phenyl), carboxy, or carboxylate (e.g., methyl ester, ethyl ester). The Z and Z' nuclei may also be substituted so as to form fused ring systems, e.g., a benzothiazole, naphthothiazole, benzoselenazole, naphthoselenazole, benzindole, benzimidazole, etc.

Examples of useful nuclei for $Z_1$ and $Z_2$ include a thiazole nucleus, e.g., thiazole, 4-methylthiazole, 4-phenylthiazole, 5-methylthiazole, 5-phenylthiazole, 4,5-dimethyl-thiazole, 4,5-diphenylthiazole, 4-(2-thienyl)-thiazole, benzothiazole, 4-chlorobenzothiazole, 5-chlorobenzothiazole, 6-chlorobenzothiazole, 7-chlorobenzothiazole, 4-methyl-benzothiazole, 5-methylbenzothiazole, 6-methylbenzothiazole, 5-bromobenzothiazole, 6-bromobenzothiazole, 5-phenylbenzothiazole, 6-phenylbenzothiazole, 4-methoxybenzothiazole, 5-methoxybenzothiazole, 6-methoxybenzothiazole, 5-iodobenzothiazole, 6-iodobenzothiazole, 4-ethoxybenzothiazole, 5-ethoxybenzothiazole, tetrahydrobenzothiazole, 5,6-dimethoxybenzothiazole, 5,6-dioxymethylenebenzothiazole, 5-hydroxybenzothiazole, 6-hydroxybenzothiazole, naphtho[2,1-d]thiazole, naptho[1,2-d]thiazole, 5-methoxynaphtho[2,3-d]thiazole, 5-ethoxynaphtho[2,3-d]thiazole, 8-methoxynaphtho[2,3-d]thiazole, 7-methoxy-naphtho[2,3-d]thiazole, 4'-methoxythianaphtheno-7',6'-4,5-thiazole, etc.; a selenazole nucleus, e.g., 4-methylselenazole, 4-phenylselenazole, benzoselenazole, 5-chlorobenzoselenazole, 5-methoxybenzoselenazole, 5-hydroxybenzoselenazole, tetrahydrobenzoselenazole, naphtho[2,1-d]selenazole, naphtho[1,2-d]selenazole, etc.; a 3,3-dialkylindolenine nucleus, e.g., 3,3-dimethylindolenine, 3,3-diethylindolenine, 3,3-dimethyl-5-methoxyindolenine, 3,3-dimethyl-5-cyanoindolenine, 3,3-dimethylbenz[e]indolenine; a quinoline nucleus, e.g., 2-quinoline, 3-methyl-2-quinoline, 5-ethyl-2-quinoline, 6-chloro-2-quinoline, 8-chloro-2-quinoline, 6-methoxy-2-quinoline, 8-ethoxy-2-quinoline, 8-hydroxy-2-quinoline, 4-quinoline, 6-methoxy-4-quinoline, 7-methyl-4-quinoline, 8-chloro-4-quinoline, etc.; or an imidazole nucleus, e.g., imidazole, 1-methylimidazole, benzimidazole, 5-chlorobenzimidazole, naphthimidazole, etc.

$R_1$ and $R_2$ may be substituted or unsubstituted aryl (preferably of 6 to 15 carbon atoms), or more preferably, substituted or unsubstituted alkyl (preferably of from 1 to 6 carbon atoms). Examples of aryl include phenyl, tolyl, p-chlorophenyl, and p-methoxyphenyl. Examples of alkyl include methyl, ethyl, propyl, isopropyl, butyl, hexyl, cyclohexyl, decyl, dodecyl, etc., and substituted alkyl groups (preferably a substituted lower alkyl containing from 1 to 6 carbon atoms), such as a hydroxyalkyl group, e.g., $\beta$-hydroxyethyl, $\omega$-hydroxybutyl, etc., an alkoxyalkyl group, e.g., $\beta$-methoxyethyl, $\omega$-butoxybutyl, etc., a carboxyalkyl group, e.g., $\beta$-carboxyethyl, $\omega$-carboxybutyl, etc.; a sulfoalkyl group, e.g., $\beta$-sulfoethyl, $\omega$-sulfobutyl, etc., a sulfatoalkyl group, e.g., $\beta$-sulfatoethyl, $\omega$-sulfatobutyl, etc., an acyloxyalkyl group, e.g., $\beta$-acetoxyethyl, $\gamma$-acetoxypropyl, $\omega$-butyryloxbutyl, etc., an alkoxycarbonylalkyl group, e.g., $\beta$-methoxycarbonylethyl, $\omega$-ethoxycarbonylbutyl, etc., or an aralkyl group, e.g., benzyl, phenethyl, etc. The alkyl and aryl groups may be substituted by one or more of the substituents exemplified above.

Q represents the atoms that complete a substituted or unsubstituted carbocylic ring, preferably a 5- or 6-membered carbocyclic ring, preferably a 5-membered carbocyclic ring. This ring can be substituted, as would be known to one skilled in the art. Examples of substituents include substituted or unsubstituted alkyl (e.g., methyl, ethyl, propyl, chloroethyl, benzyl), substituted or unsubstituted aryl (e.g., phenyl, p-chlorophenyl), halogen (e.g., chloro, fluoro), hydroxy, alkoxy (e.g., methoxy, ethoxy), and others that would be apparent to one skilled in the art.

Z" represents the atoms necessary to complete a substituted or unsubstituted heterocyclic ring, preferably a 5- or 6-membered heterocyclic ring. This ring may be substituted, as would be known to one skilled in the art. Examples of substituents include alkyl such as alkyl of from 1 to 8 carbon atoms (e.g., methyl, ethyl, butyl), which may themselves be substituted with known substituents such as hydroxy, halogen, and the like (e.g., hydroxyethyl, chloroethyl), carboxylate of from 1 to 9 carbon atoms (e.g., methyl ester, ethyl ester), amido, sulfonamido, halogen (e.g., chloro, fluoro), and others that would be known to one skilled in the art. The ring may also be substituted so as to form fused ring systems, e.g., an isoindoline ring, etc.

Examples of nuclei useful as Z" include:

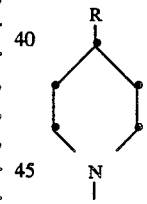

R = $CO_2C_2H_5$, —$CO_2H$, —$CONH_2$, H

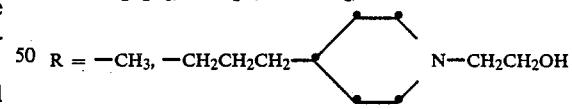

R = —$CH_3$, —$CH_2CH_2CH_2$— ... N—$CH_2CH_2OH$

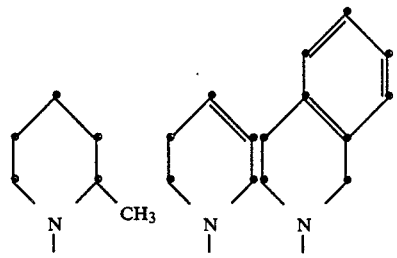

R = —$CH_2CH_2$—OH, —$CH_2CH_2CH_2CH_2$—

-continued

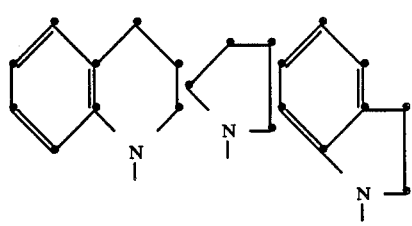

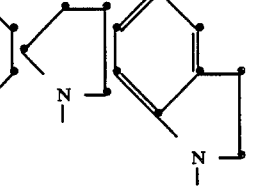

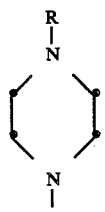

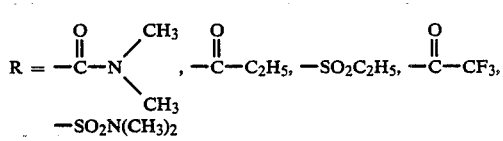

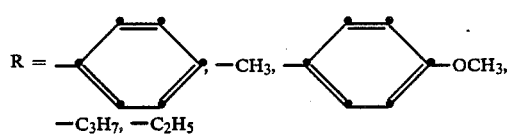

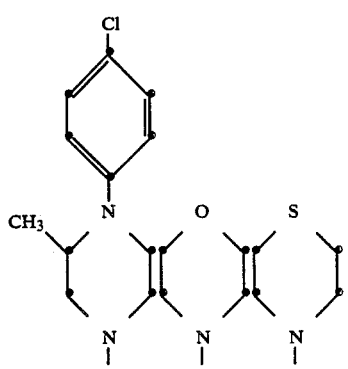

-continued

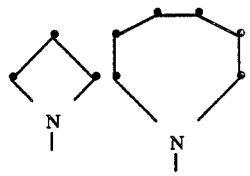

In a preferred embodiment,

is represented by the formula:

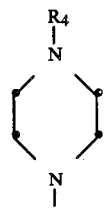

where $R_4$ is selected from the group consisting of

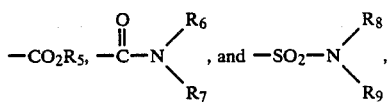

where $R_5$, $R_6$, $R_7$, $R_8$, and $R_9$ are each independently substituted or unsubstituted alkyl of from 1 to 8 carbon atoms (e.g., methyl, ethyl, propyl, isopropyl, butyl, which may be substituted as known in the art with, for example, hydroxy, alkoxy, aryl, or halogen).

X represents a counterion as necessary to balance the charge of the dye molecule. For example, when the dye molecule is substituted with at least two anionic substituents (e.g., sulfo), then X will be a cation. Similarly, if the dye molecule is substituted with only one anionic substituent, the counterion X is not present, and when the dye molecule is substituted with no anionic substituents, X is an anion. Such counterions are well-known in the art. Useful anionic counterions include chloride, bromide, iodide, p-toluene sulfonate, methane sulfonate, methyl sulfate, ethyl sulfate, perchlorate, and the like. Useful cationic counterions include sodium, potassium, triethylammonium, and the like.

Examples of dye compounds according to formula (I) include:

1.
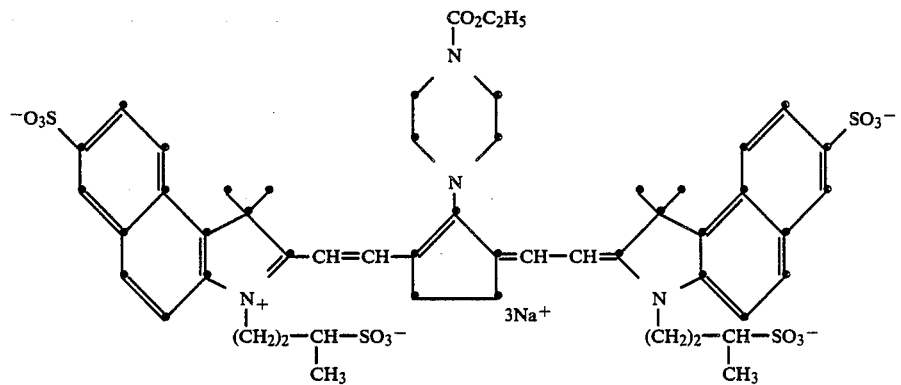
2.
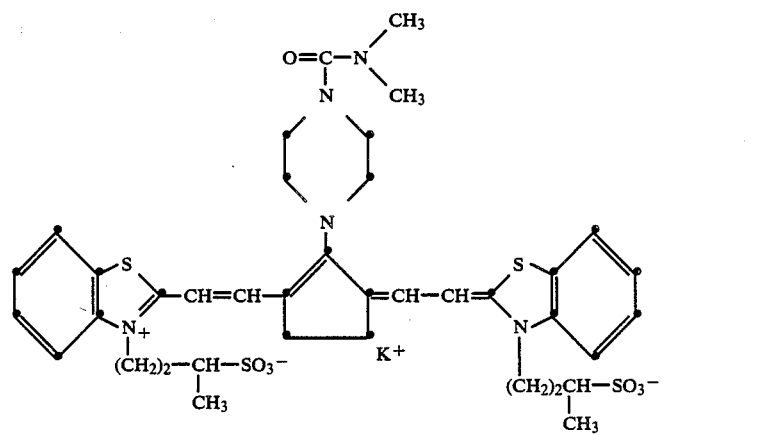
3.
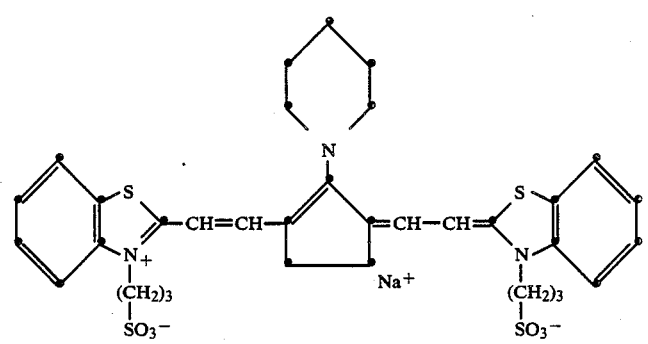
4.
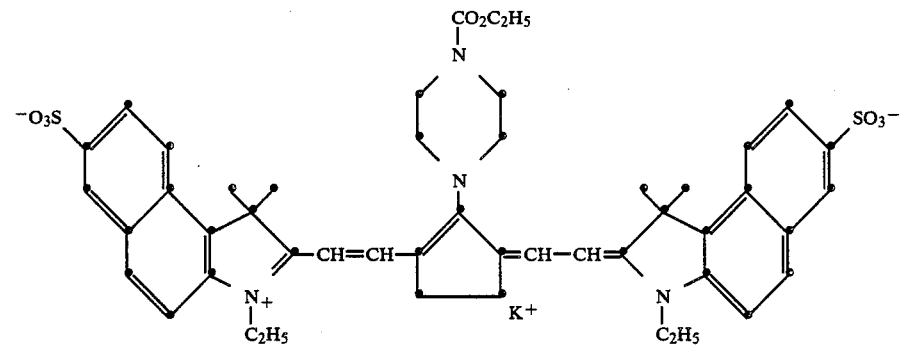

-continued
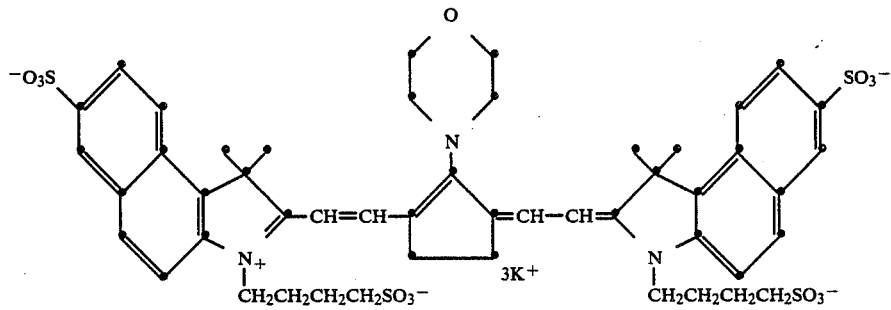
5.
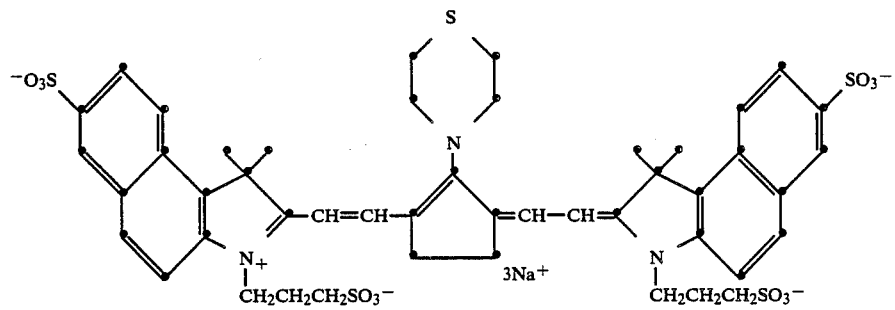
6.
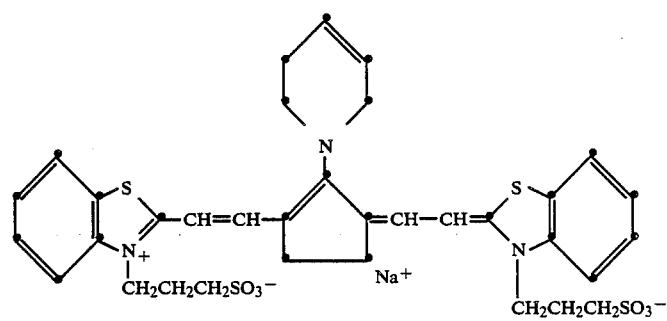
7.
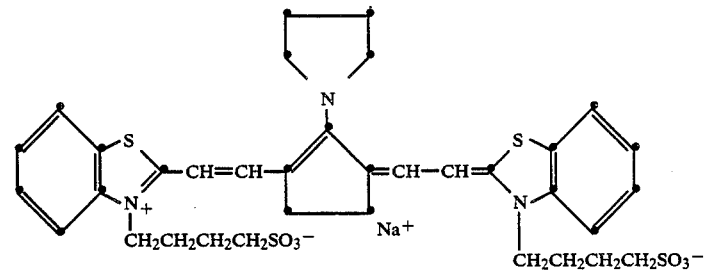
8.
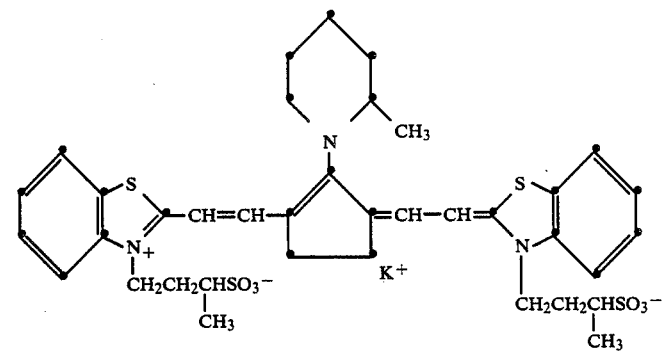
9.

-continued
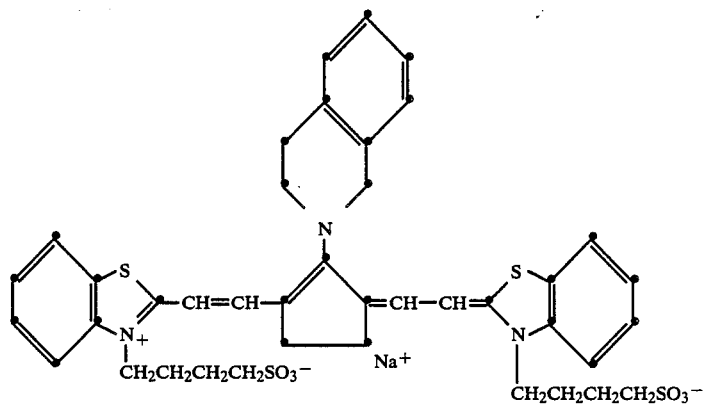
10.
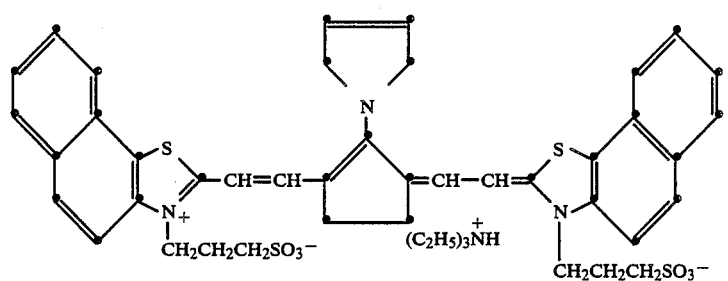
11.
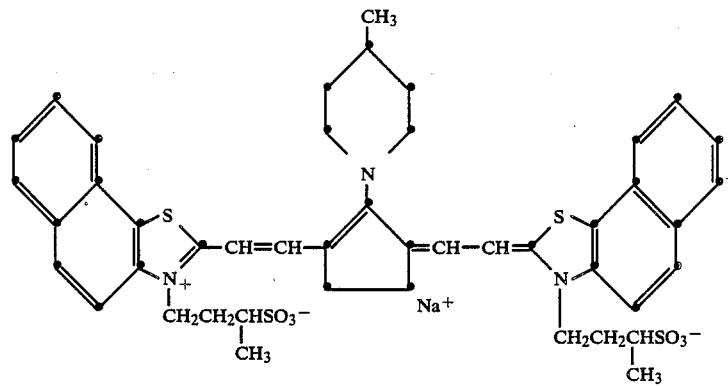
12.
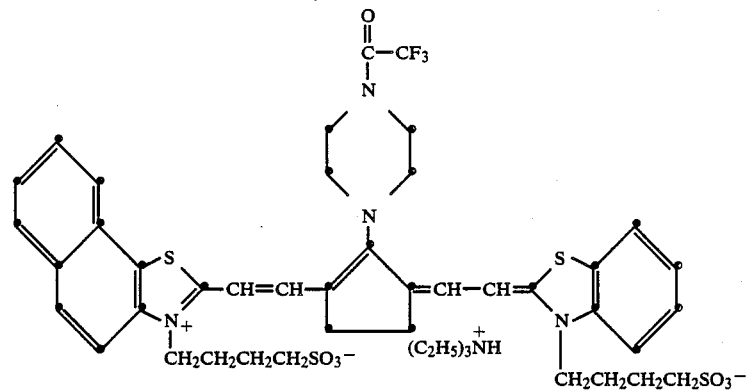
13.

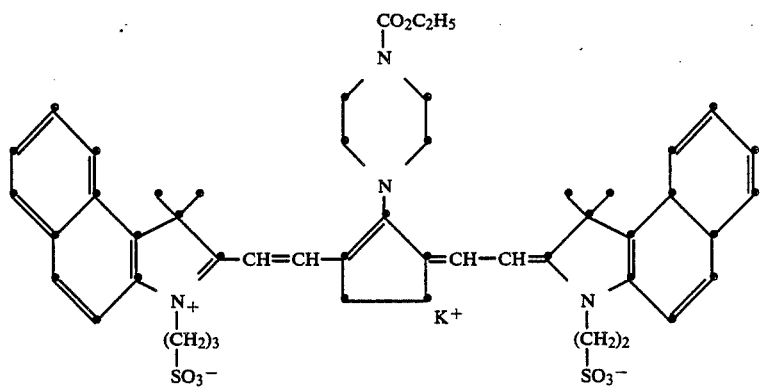
14.
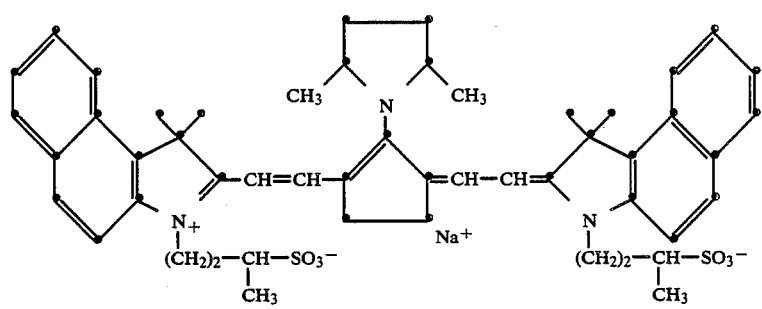
15.
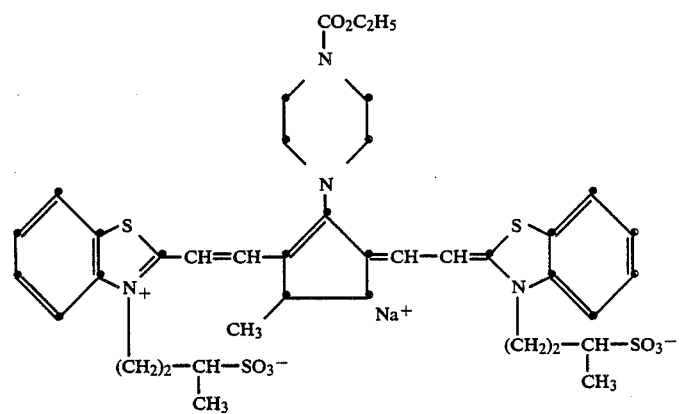
16.
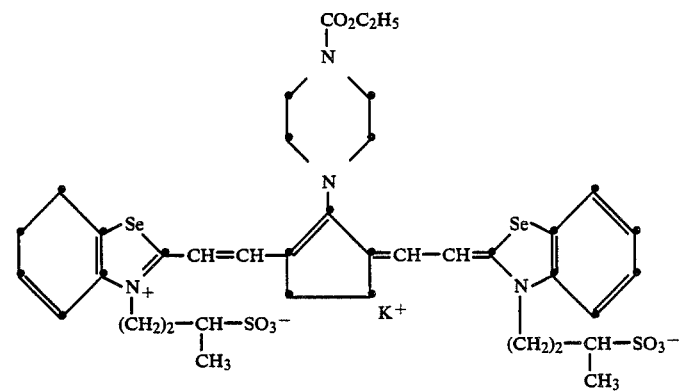
17.

-continued
18.
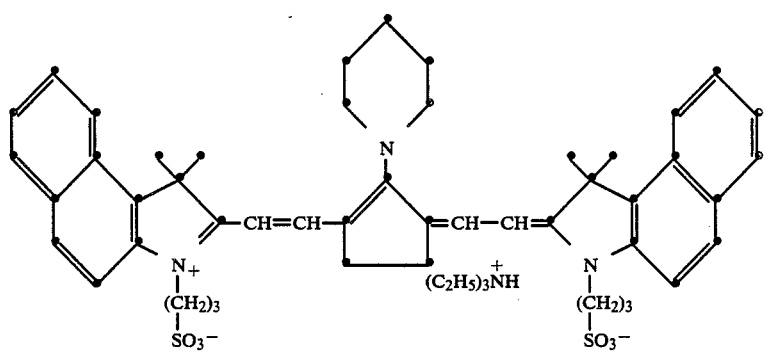
19.
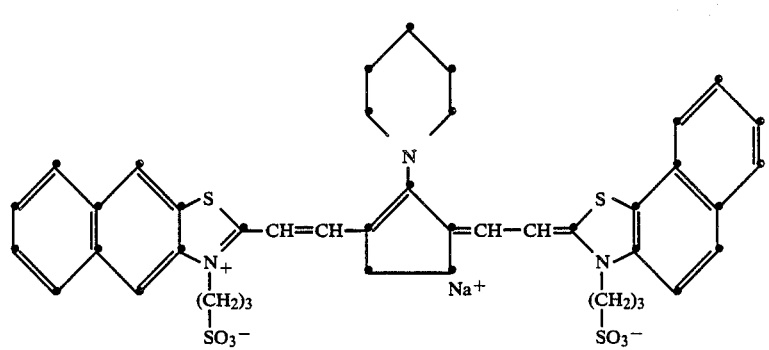
20.
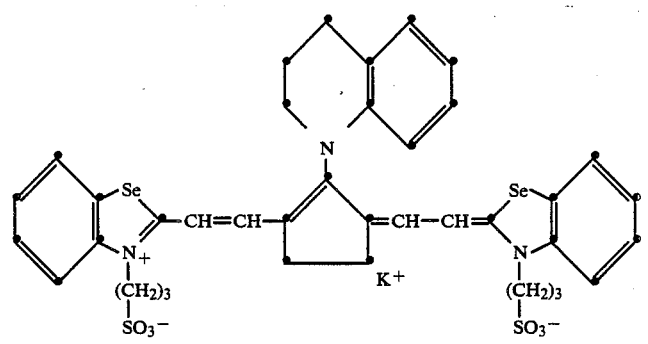
21.
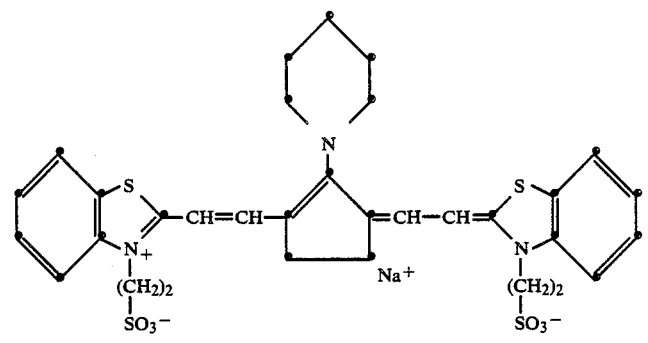

22.
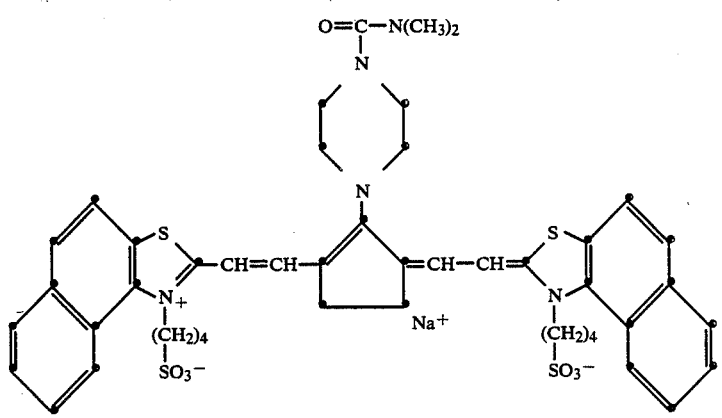
23.
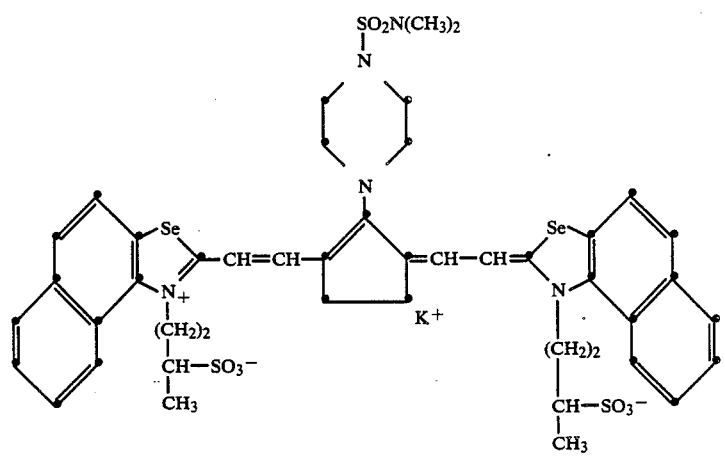
24.
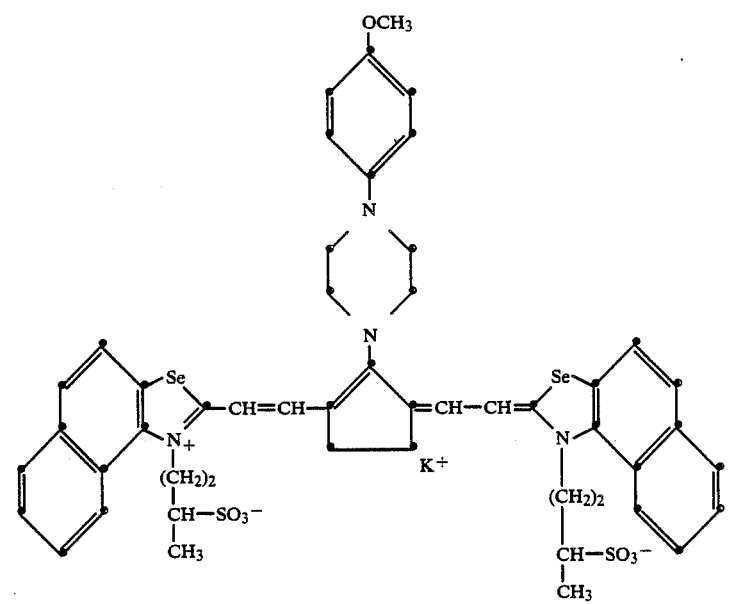

25.

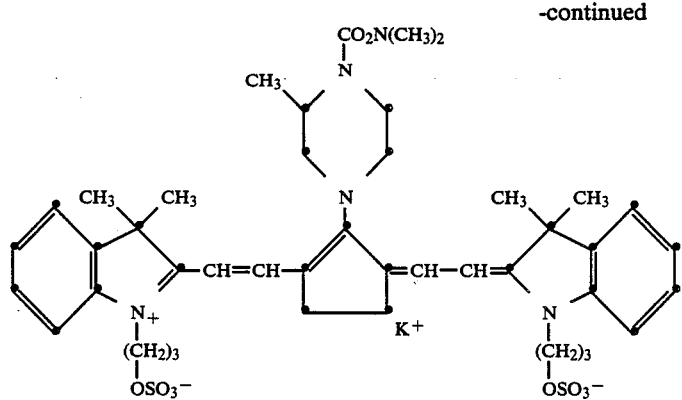

26.

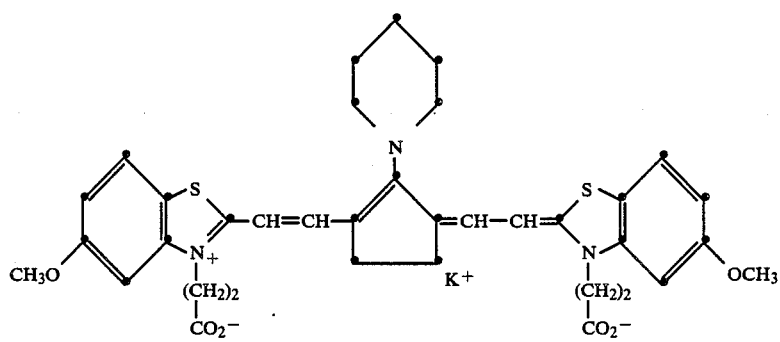

27.

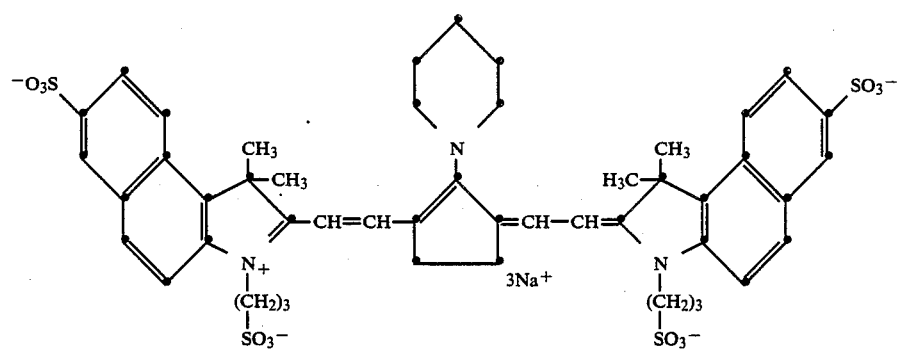

The dyes of formula (I) can be made according to well-known procedures in the art, such as those described in James, *The Theory of the Photographic Process*, 4th ed., 1977, MacMillan, New York and U.S. Pat. Nos. 2,895,955, 3,148,187, and 3,423,207. A representative synthesis of a dye according to formula (I) is set forth below.

Preparation 1 Preparation of Dye 1

Step A - Preparation of 7-Sulfo-1,1,2-trimethyl-1H-benz[e]indole (Intermediate A)

1,1,2-Trimethyl-1H-benz[e]indole, 100 g. was added with stirring to 500 mL of concentrated $H_2SO_4$. The mixture was heated at 180° C. for ½ h, cooled to 60° C. and poured onto 2 Kg ice. Cautionsly 500 ml of 50% aqueous NaOH was added. After 24 hours at room temperature the solid was filtered off, and 500 mL of saturated aqueous $Na_2SO_4$ was added. The resulting solid precipitate was collected, added to the previously filtered solid, and recrystallized from 2 L of $H_2O$. Yield 25 g after overnight vacuum drying at 50° C. The location of the sulfo group was determined as being the 7-position by proton nuclear magnetic resonance measurements.

Step B - Preparation of Anhydro-7-sulfo-3-(3-sulfobutyl)-1,1,2-trimethyl-1H-benz[e]indolinium Hydroxide (Intermediate B)

A mixture of 28 g of 7-sulfo-1,1,2-trimethyl-1H-benz[e]indole (Intermediate A) and 40 g of 2,4-butanesultone was stirred and slowly heated to an internal temperature of 210° C. over a period of 1.5 h. The reaction mass was held at 210° C. for 20 minutes until a homogeneous brown liquid was obtained. After cooling to room temperature, the solidified mass was dissolved in 100 mL of boiling methanol. After cooling to room temperature, the solid that precipitated was collected by suction filtration. This solid was suspended in 500 mL of acetone with stirring. Filtration and drying at 0.5 mm Hg overnight gave 35 g (85%) of light gray solid. The infrared spectrum was in agreement with the expected structure.

Step C - Preparation of Dye 1

2.1 g of intermediate B of Example 1 and 1.3 g 1-[2,5-bis(anilinomethylene)cyclopentylidene]-4-ethoxycarbonylpiperazinium tetrafluoroborate were combined in 5 ml triethylamine and 20 ml dimethylformamide and heated at reflux for 5 minutes. After cooling, the mixture was diluted with ether with stirring. The ether phase was decanted and the remaining product was dissolved in a 50/50 mixture of methanol and water. Excess potassium acetate dissolved in methanol was added and the resulting precipitate was recrystallized from a 50/50 mix of methanol and water to yield Dye 1. $\lambda$-max=738 nm (MeOH), $\epsilon$-max=15.34×10$^4$.

The dyes of formula (I) impart a desirable cool image tone to photographic elements in which they are incorporated. Image tone, and whether it is perceived as "cool" or "warm", depends on psycho-physical reactions of human observers. Image tones perceived as cool have a hue that appears more blue while image tones perceived as warm have a hue that appears more yellow. This relationship between the blueness or yellowness of the hue of an image can be quantified according to a relationship defined by the Commission Internationale de l'Eclairage. This formula, identified as the CIE 1976 (L*a*b*)-Space, defines a color space where the quantity L* defines the perceived lightness with greater values indicating lighter tone, the quantity a* defines hue along a green-red axis with negative values indicating more green hue and positive values indicating more red hue, and the quantity b* defines hue along a yellow-blue axis with negative values indicating more blue hue and positive values indicating more yellow hue.

The CIE 1976 (L*a*b*)-space is defined by the equations:

$$L^* = 116 (Y/Y_o)^{\frac{1}{3}} - 16$$

$$a^* = 500[(X/X_o)^{\frac{1}{3}} - (Y/Y_o)^{\frac{1}{3}}]$$

$$b^* = 200[(Y/Y_o)^{\frac{1}{3}} - (Z/Z_o)^{\frac{1}{3}}]$$

where $X_n$, $Y_n$, and $Z_n$ are the tristimulus values of the standard illuminant with $Y_n$ equal to 100. According to the formula, a desirable cool image tone would be signified by a blue hue, which would be indicated by more negative values for b*. A more detailed description of the CIE 1976 (L*a*b*)-space can be found in G. Wyszecki & W. S. Stiles, *Color Science, Concepts and Methods, Quantitative Data and Formulae*, J. Wile & Sons, N.Y. (1982).

The dyes of formula (I) may be incorporated in any layer of a photographic element where it is desired to absorb infrared radiation. These include essentially any layer where it is known to use filter dyes, such as overcoat layers, undercoat layer, and interlayers. The dye may be advantageously used in elements having other blue dyes, either in the support or in layers thereon, to enhance the cool tone provided by those dyes, or it may be used in an element without any other blue dyes. Such blue dyes are well-known in the art. The dyes may be in a layer separate from the radiation-sensitive layer(s) that is on the same side of the support as the radiation-sensitive layer or on a different side of the support as the radiation-sensitive layer. The dye may also be located in the radiation-sensitive layer as an absorber dye, but is preferably not adsorbed to the silver halide. The dye is preferably located in a layer where it will be visible along with the image provided by the element, but the exact location of the layer containing the dye of formula (I) is not crucial, as the primary advantages of the dye, its infrared absorption and blue hue will be present reagardless of its location.

The dye of formula (I) is advantageously used as a J-aggregate, which will generally absorb deeper in the infrared than the molecular form of the dye. Aggregation also helps to immobilize the dye to prevent wandering and to reduce unwanted interaction with radiation-sensitive silver halide in the photographic material.

The dye of formula (I) can be present in any amount that is known to be useful for filter dyes in photographic elements. The exact amount needed for the dye to be effective as a filter dye will vary depending on the specific characteristics of the photographic element, such as the speed and $\lambda$-max of the radiation-sensitive material, sensitizing dyes, supersensitizers, and the like, and specific levels of effective amounts of the dye would be well-known to one skilled in the art. The dye is preferably coated at a level of at least about 5 mg/m$^2$ and preferably at least about 10 mg/m$^2$, and can range up to about 500 mg/m$^2$ and preferably up to about 200 mg/m$^2$.

The radiation-sensitive layer(s) of the photographic element of the invention contain a radiation-sensitive component sensitized so as to be responsive to one or more portions of the infrared spectrum. This radiation-sensitive component is preferably silver halide, such as silver chloride, silver bromide, silver chlorobromide, silver iodide, silver bromoiodide, silver chlorobromiodide, and the like. Silver halide emulsions and their preparation are well-known in the art and do not require further description herein. Silver halide emulsions and their preparation are further described in in *Research Disclosure*, Item 17643, December, 1978 [hereinafter, *Research Disclosure I*], Section I; *Research Disclosure*, Item 18431, August, 1979 [hereinafter, *Research Disclosure II*], Section I; and *Research Disclosure*, Item 22534, January, 1983, and the references cited therein, as well as U.S. Pat. No. 4,425,426.

While silver halide is the preferred radiation-sensitive material for use in the present invention, the element may utilize other radiation-sensitive materials known in the art, such as diazo image-forming systems, light-sensitive tellurium-containing compounds, light-sensitive cobalt-containing compounds, and others described in, for example, J. Kosar, *Light-Sensitive Systems: Chemistry and Application of Nonsilver Halide Photographic Processes*, J. Wiley & Sons, N.Y. (1965).

The radiation-sensitive material described above can be sensitized to infrared by techniques known in the art. Sensitization of silver halide can be accomplished with chemical sensitizers such as gold compounds, iridium compounds, or other group VIII metal compounds, or with spectral sensitizing dyes such as cyanine dyes, merocyanine dyes, styryls, or other known spectral sensitizers. Additional information on sensitization of silver halide is described in *Research Disclosure I*, Sections I–IV and *Research Disclosure II*, Sections I and X.

The layer of the photographic element of the invention containing the dye of formula (I) and/or the radiation-sensitive material also comprises a vehicle. Such vehicles are well-known in the art and are described, for example, *Research Disclosure I*, Section IX. These include hydrophilic colloids such as gelatin (e.g., cattle bone gelatin, pigskin gelatin), gelatin derivatives (e.g., phthalated gelatin, acetylated gelatin), polysaccharides (e.g., dextran); synthetic polymers such as polyvinyl alcohol, acrylamide polymers, polymers of alkyl and sulfoalky acrylates and methacrylates, hydrolyzed polyvinyl acetates, and polyamides, to name a few. Although the dye of formula (I) is generally immobile in the J-aggregated state, it may be desirable, in certain instances, to use the dye in combination with a mordant, such as polyvinylimidazole or polyvinylpyridine, to aid in immobilizing the dye. The technology of mordanting dyes is well-known in the art, and is described in further detail in U.S. Pat. Nos. 3,282,699, 3,455,693, and 3,438,779.

The layers of the element may be hardened, as is known in the art. Hardeners are described in *Research Disclosure I*, Section X. Typical hardening compounds include formaldehyde, vinyl sulfones, carbamoyl pyridiniums, and formamidiniums.

The dye of formula (I) is generally added to a water, solvent, or mixture thereof solution or melt of the vehicle to form a coating composition. The coating composition may also contain a coating aid as is known in the art and described in *Research Disclosure I*, Section XI. This composition is then coated as a layer on a support of the photographic element of the invention.

The support of the element of the invention can be any of a number of well-known supports for photographic elements. These include polymeric films such as cellulose esters (e.g., cellulose triacetate and diacetate) and polyesters of dibasic aromatic carboxylic acids with divalent alcohols (e.g., poly(ethylene terephthalate)), paper, and polymer-coated paper. Such supports are described in further detail in *Research Disclosure I*, Section XVII and *Research Disclosure II*, Section XII.

The element of the invention can also include any of a number of other well-known additives and layers, as described in *Research Disclosures I and II*. These include, for example, optical brighteners, antifoggants, emulsion stabilizers, image stabilizers, light-absorbing materials such as filter layers or intergrain absorbers, light-scattering materials, gelatin hardeners, coating aids and various surfactants, overcoat layers, interlayers and barrier layers, antistatic layers, plasticizers and lubricants, matting agents, development inhibitor-releasing couples, bleach accelerator-releasing couplers, and other additives and layers known in the art.

The photographic elements of the invention, when exposed, are processed to yield an image. After processing, the dye of formula (I) will generally impart to the image a blue hue characteristic of a cool image tone. This hue will generally be characterized by a b* value of about 0 or less. In other words, the dye in the element, if it could be observed by itself in the absence of any other hue-imparting components in the element, such as other dyes or the silver image itself, would have a b* value of about 0 or less. The actual observed hue of the dye will, of course, also depend on the a* value too. Large a* values toward green or red may make the hue of the dye appear less blue; however, for any given a* value, dyes having smaller b* values as do the dyes of formula (I) will have a "bluer" hue and a cooler image tone than dyes with higher b* values.

Processing of the photographic element of the invention can be by any type of known photographic processing, as described in *Research Disclosure I*, Sections XIX–XXIV. A negative image can be developed by color development with a chromogenic developing agent followed by bleaching and fixing. A positive image can be developed by first developing with a non-chromogenic developer, then uniformly fogging the element, and then developing with a chromogenic developer. If the material does not contain a color-forming coupler compound, dye images can be produced by incorporating a coupler in the developer solutions.

Bleaching and fixing can be performed with any of the materials known to be used for that purpose. Bleach baths generally comprise an aqueous solution of an oxidizing agent such as water soluble salts and complexes of iron (III) (e.g., potassium ferricyanide, ferric chloride, ammonium of potassium salts of ferric ethylenediaminetetraacetic acid), water-soluble persulfates (e.g., potassium, sodium, or ammonium persulfate), water-soluble dichromates (e.g., potassium, sodium, and lithium dichromate), and the like. Fixing baths generally comprise an aqueous solution of compounds that form soluble salts with silver ions, such as sodium thiosulfate, ammonium thiosulfate, potassium thiocyanate, sodium thiocyanate, thiourea, and the like.

The invention is further illustrated by the following Examples:

EXAMPLE 1

A photographic element was prepared according to the following format:

| | | |
|---|---|---|
| | gelatin | (0.77 g/m$^2$) |
| | bis(vinyl sulfonyl methyl ether) | (2.5% based on total gel) |
| | 0.26 μm infrared-sensitized Ag Br$_{98.3}$I$_{1.7}$ | (2.25 g/m$^2$) |
| | gelatin | (2.45 g/m$^2$) |
| | blue support | |
| | gelatin | (3.01 g/m$^2$) |

-continued

| filter dye 1 or comparison dye A | (54 mg/m$^2$) |
|---|---|
| gelatin | (0.77 g/m$^2$) |
| bis(vinyl sulfonyl methyl ether) | (2.5% based on total gel) |

Comparison dye A:

$^-O_3S$—[naphthalene-indole]—C(CH$_3$)$_2$—CH=CH—CH=CH—CH=CH—CH=C(CH$_3$)$_2$—[indole-naphthalene]—SO$_3^-$ with N$_+$—(CH$_2$)$_2$—CH(CH$_3$)—SO$_3^-$ and N—(CH$_2$)$_2$—CH(CH$_3$)—SO$_3^-$ substituents The elements were exposed to a test pattern image with infrared radiation and processed with a hydroquinone developer in a rapid access process, such as illustrated in Barnes et al U.S. Pat. No. 3,545,971. No halation was observed in the image in either element, indicating that effective antihalation protection was provided by both dye 1 and comparison dye A.

The blue hue (b*) of the images at a density of 1.2 was determined according to the CIE (L*a*b*) method using a standard CIE Source B illumination source. The b* for the element of the invention with dye 1 was -6.6 compared to -5.0 for the comparison element with dye A. This indicates a significantly bluer hue for the element of the invention.

EXAMPLES 2–13

Elements were prepared according to the following format:

| gelatin | (4.52 g/m$^2$) |
|---|---|
| dye as identified and at level set forth in Table I | |
| clear or blue support | |

The elements were processed as in Example 1. The absorption of the dye was measured before and after processing. The value for b* using a standard CIE source B light source was determined for some of the processed elements. The results are presented in Table 1.

TABLE I

| Dye | Level (millimol/ft$^2$) | Support | Dye λ-max(nm)[1] | Dye λ-sec(nm)[1] | Density at λ-max(nm)[1] | a*[2] | b*[2] | Comments |
|---|---|---|---|---|---|---|---|---|
| None (Control) | | clear | | | | −0.21 | +0.89 | |
| 1 | 0.0025 | clear | 815 | — | 0.52 | −1.81 | −0.47 | |
| 2 | 0.0025 | clear | 806 | — | 0.45 | −1.49 | −0.22 | |
| 3 | 0.0025 | clear | 887 | 680 | — | — | — | |
| A (Comparison) | 0.0025 | clear | >900 | 802 | 0.25 | −0.85 | +1.85 | yellowish green hue |
| 1 | 0.0050 | clear | 815 | — | 0.98 | −3.67 | −2.27 | |
| 2 | 0.0050 | clear | 806 | — | 1.41 | −4.97 | −3.38 | |
| 3 | 0.0050 | clear | 887 | 680 | 0.98 | −2.36 | −1.82 | |
| A (Comparison) | 0.0050 | clear | >900 | 802 | 0.37 | −1.87 | +2.77 | yellowish green hue |
| None (Control) | | blue | | | | −6.23 | −13.44 | |
| 1 | 0.0025 | blue | 815 | — | 0.45 | −7.63 | −14.56 | |
| 2 | 0.0025 | blue | 806 | — | 0.41 | −7.18 | −13.93 | |
| 3 | 0.0025 | blue | 887 | 680 | 0.32 | −6.79 | −13.74 | |
| A (Comparison) | 0.0025 | blue | >900 | 802 | 0.18 | −6.80 | −12.21 | warmer tone than blue support alone |
| 1 | 0.0050 | blue | 815 | — | 0.78 | −9.01 | −15.85 | |
| 2 | 0.0050 | blue | 806 | — | 0.66 | −8.05 | −14.81 | |
| 3 | 0.0050 | blue | 887 | 680 | 0.61 | −7.22 | −14.35 | |
| A (Comparison) | 0.0050 | blue | >900 | 802 | 0.24 | −7.54 | −11.73 | warmer tone than blue support alone |

TABLE I-continued

| Dye | Level (millimol/ ft²) | Support | Dye λ-max(nm)[1] | Dye λ-sec(nm)[1] | Density at λ-max(nm)[1] | a*[2] | b*[2] | Comments |
|---|---|---|---|---|---|---|---|---|
| Before processing | | | | | | | | |
| After processing | | | | | | | | |

The results in Table I show that the dyes of the invention absorb radiation in the infrared region and also have a desirable blue hue.

The invention has been described in detail with particular reference to preferred embodiments thereof, but it will be understood that variations and modifications can be effected within the spirit and scope of the invention.

What is claimed is:

1. A photographic element comprising a support having thereon an infrared radiation-sensitive silver halide emulsion layer and a hydrophilic colloid layer, which is the same as or different from the infrared radiation-sensitive layer, comprising at least about 5 mg/m² of a filter dye having the formula:

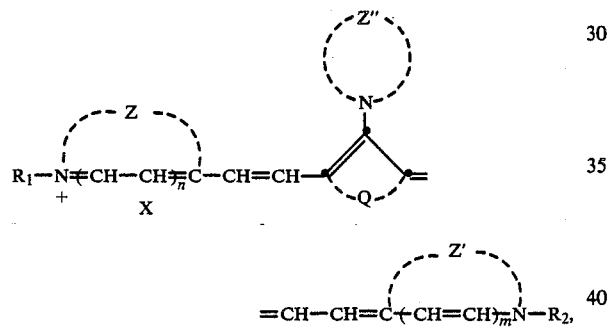

wherein
Z and Z' each independently represents the atoms necessary to complete a substituted or unsubstituted: thiazole nucleus, selenazole nucleus, indole nucleus, imidazole nucleus, or quinoline nucleus,
$R_1$ and $R_2$ each independently substituted or unsubstituted alkyl or substituted or unsubstituted aryl,
Z" represents the atoms necessary to complete a substituted or unsubstituted heterocyclic ring,
Q represents the atoms necessary to complete a substituted or unsubstituted carbocyclic ring,
m and n each independently represents 0 or 1, and
X represents a counterion as needed to balance the charge of the molecule.

2. A photographic element according to claim 1 wherein the dye is in the radiation-sensitive layer.

3. A photographic element according to claim 1 wherein the dye is in a layer other than the radiation-sensitive layer.

4. A photographic element according to claim 3 wherein the dye is an antihalation dye.

5. A photographic element according to claim 4 wherein the dye-containing layer is located on the side of the support opposite from the radiation-sensitive layer.

6. A photographic element according to claim 4 wherein the dye-containing layer is located between the support and the radiation-sensitive layer.

7. A photographic element according to claim 1 wherein the radiation-sensitive layer comprises an emulsion of infrared-sensitive silver halide and a vehicle.

8. A photographic element according to claim 1 wherein the layer comprising the dye is substantially free of any compound that would deaggregate the dye.

9. A photographic element according to claim 1 comprising about 10 to 200 mg/m² of the dye.

10. A photographic element according to claim 1 wherein the support comprises another filter dye that is a blue dye resistant to removal on processing.

11. A photographic element according to claim 1 wherein the element further comprises a layer that includes another filter dye that is blue dye resistant to removal on processing.

12. A photographic element according to claim 1 wherein Z and Z' each independently represents a substituted or unsubstituted: thiazole nucleus, selenazole nucleus, or indole nucleus.

13. A photographic element according to claim 1 wherein

is represented by the formula:

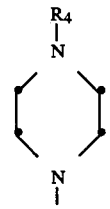

wherein $R_4$ is selected from the group consisting of

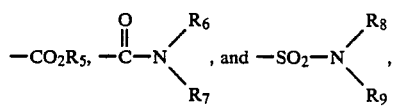

wherein $R_5$, $R_6$, $R_7$, $R_8$, and $R_9$ are each independently alkyl of from 1 to 4 carbon atoms.

14. A photographic element according to claim 1 wherein the dye is selected from the group consisting of:

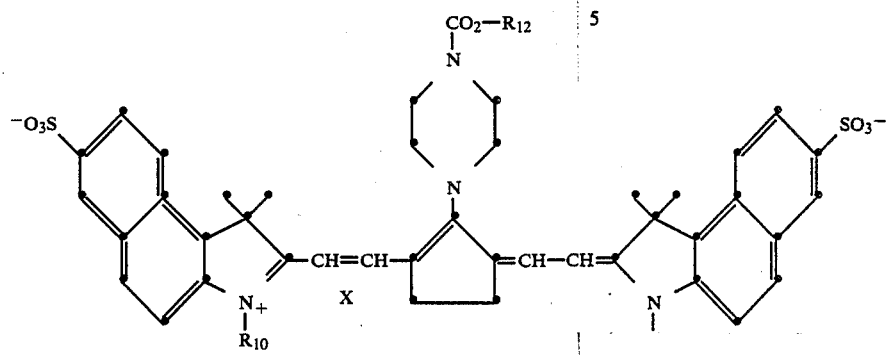

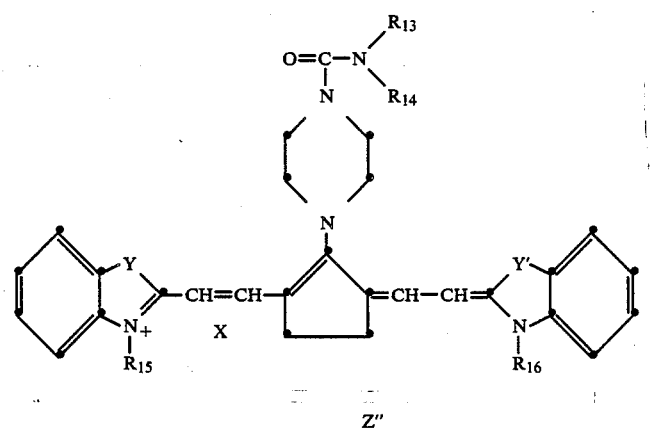

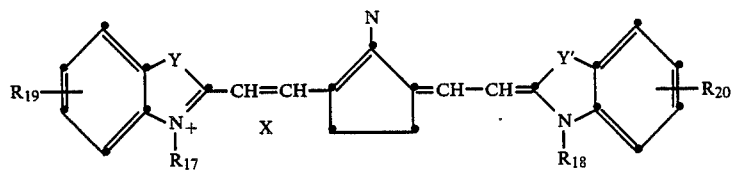

wherein $R_{10}$ and $R_{11}$ each independently represents alkyl of from 1 to 6 carbon atoms or sulfoalkyl of from about 2 to 6 carbon atoms, $R_{12}$, $R_{13}$, and $R_{14}$ each independently represents alkyl of from about 1 to 4 carbon atoms, $R_{15}$, $R_{16}$, $R_{17}$, and $R_{18}$ each independently sulfoalkyl of from about 2 to 6 carbon atoms, $R_{19}$ and $R_{20}$ each independently represents H or 5,6-benzo, $Z''$ represents the atoms necessary to complete a piperidyl or a pyrrolidyl ring structure, Y and Y' each independently represents S or Se, and X represents a counterion as needed to balance the charge of the molecule.

* * * * *

UNITED STATES PATENT AND TRADEMARK OFFICE
CERTIFICATE OF CORRECTION

PATENT NO. : 4,933,269

DATED : June 12, 1990

INVENTOR(S) : Parton, et al

Page 1 of 2

It is certified that error appears in the above-identified patent and that said Letters Patent is hereby corrected as shown below:

Column 29, lines 5 - 18 should read,

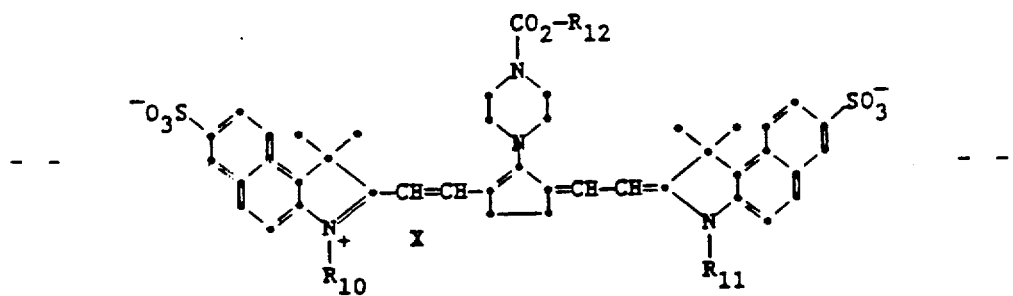

UNITED STATES PATENT AND TRADEMARK OFFICE
CERTIFICATE OF CORRECTION

PATENT NO. : 4,933,269

DATED : June 12, 1990

INVENTOR(S) : Parton, et al

Page 2 of 2

It is certified that error appears in the above-identified patent and that said Letters Patent is hereby corrected as shown below:

Column 29, lines 34 - 43 should read,

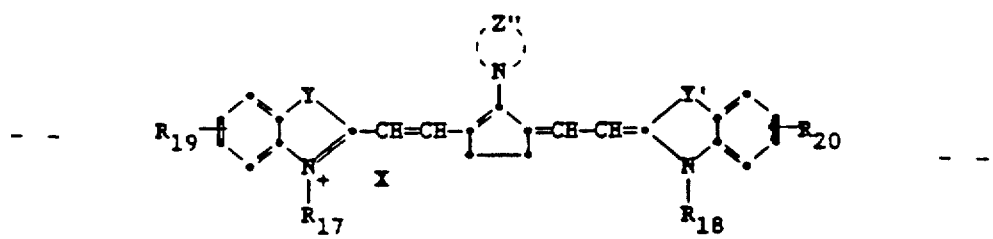

Signed and Sealed this

Seventh Day of July, 1992

Attest:

Attesting Officer

DOUGLAS B. COMER

Acting Commissioner of Patents and Trademarks